(12) United States Patent
Déverin

(10) Patent No.: US 6,804,051 B2
(45) Date of Patent: Oct. 12, 2004

(54) OPTICAL INSTRUMENT HAVING A BINOCULAR VIEWING PORT

(75) Inventor: Jacques Alain Déverin, Widnau (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 114 days.

(21) Appl. No.: 10/081,833

(22) Filed: Feb. 22, 2002

(65) Prior Publication Data

US 2002/0118451 A1 Aug. 29, 2002

(30) Foreign Application Priority Data

Feb. 23, 2001 (DE) .......................... 101 08 988

(51) Int. Cl.⁷ .......................... G02B 23/00; G02B 27/14
(52) U.S. Cl. .................. 359/431; 359/363; 359/407; 359/629
(58) Field of Search ............... 359/362–363, 359/368–431, 618–630, 831–837, 634, 636–640

(56) References Cited

U.S. PATENT DOCUMENTS

| | | | |
|---|---|---|---|
| 4,138,191 A | | 2/1979 | Peyman et al. ............. 359/368 |
| 4,786,154 A | * | 11/1988 | Fantone et al. ............. 259/369 |
| 5,095,887 A | * | 3/1992 | Leon et al. ................ 600/166 |
| 6,005,710 A | * | 12/1999 | Pensel et al. .............. 359/379 |
| 6,081,371 A | * | 6/2000 | Shioda et al. ............. 359/372 |
| 6,473,229 B2 | * | 10/2002 | Nakamura ................ 359/377 |

* cited by examiner

Primary Examiner—Thong Q Nguyen
(74) Attorney, Agent, or Firm—Hodgson Russ LLP

(57) ABSTRACT

The invention concerns an optical instrument having at least one binocular viewing port, in which in the two channels of at least one binocular beam path there are provided beam splitters that make it possible to reflect a portion of the beam path out onto an imaging device or the like, and to reflect into the respective channel, toward the viewing port, data or images that have been made available.

11 Claims, 2 Drawing Sheets

OPTICAL INSTRUMENT HAVING A BINOCULAR VIEWING PORT

CROSS REFERENCE TO RELATED APPLICATIONS

This invention claims priority of the German patent application 101 08 988.0 which is incorporated by reference herein.

FIELD OF THE INVENTION

The invention refers to an optical instrument.

BACKGROUND OF THE INVENTION

In microscopes, for example, and in particular in stereomicroscopes, it is often desirable to reflect data and/or images into the one binocular channel or stereo channel, and to attach to the other binocular channel or stereo channel an imaging device, such as a photographic camera or a video unit, which acquires the microscope image, i.e. for example a specimen image or (for a surgical microscope) the surgical site.

In an optical instrument or device having at least one binocular viewing port, for example a stereomicroscope, it is known to provide in the two channels of the binocular beam path beam splitters that make it possible to reflect a portion of the beam path out onto the imaging device or the like, and/or to reflect in toward the viewing port data or images that have been made available.

Many users are now requesting the ability to choose without restriction whether the image is reflected into, or the imaging device is attached to, the left or the right channel. Often it is even desirable to be able to change, during operation, which device is attached to which channel.

In the existing art, therefore, both the imaging device and the display device that makes available the data or images that are to be reflected in are configured as modules, so that they can be selectably flange-mounted onto the left or right stereo channel. Changing modules from one side to another is troublesome, however, and the risk of confusion also exists. Because of the need for unrestricted access to the individual modules, the space or volume required is moreover very large.

SUMMARY OF THE INVENTION

It is the object of the invention further to develop an optical instrument which allows a switching between having the channels into which data and/or images are reflected, or out of which a portion of the beam path is reflected out to an imaging module, without the need to reinsert or remount modules.

According to the present invention the above object is achieved by an optical instrument which comprises:

at least one binocular viewing port defining at least one binocular beam path which has two channels;
an imaging module,
a display module,
a plurality of beam splitters for reflecting a portion of the beam path out onto the imaging module toward the viewing port, and for reflecting into one channel data or images that have been made available on the display module, wherein the imaging module and the display module are arranged in stationary fashion with respect to the optical instrument; and
at least one optical switcher provided for the imaging module and the display module that optically connects the respective module to the beam splitter in the one or the other channel.

According to the present invention, the module or modules are arranged in stationary fashion. In order to connect the individual modules optically to the particular desired channel of the binocular beam path—which is preferably but not necessarily a stereo beam path—there is provided for each module (at least) one optical switcher that optically connects the respective module to the beam splitter in the one or the other channel, i.e. creates an optical path. Optionally, the optical switcher can also have a position in which it does not create a connection between the respective module and one of the channels of the binocular beam path.

It is preferred in this context if the optical switchers are rotatable or slidable prisms. Rhomboid prisms, for example, can be used as the prisms. Of course other "optical switches," such as simple mirrors or electrooptical elements can nonetheless also be used, provided their only function is to open up or close off an optical path between the respective module and the beam splitter provided in the one or the other channel.

It is also possible, in addition, to provide more than one optical switcher for each module.

BRIEF DESCRIPTION OF THE DRAWINGS

The invention will be described below in more detail on the basis of exemplary embodiments and with reference to the drawings, in which.

DETAILED DESCRIPTION OF THE INVENTION

Figure 1:
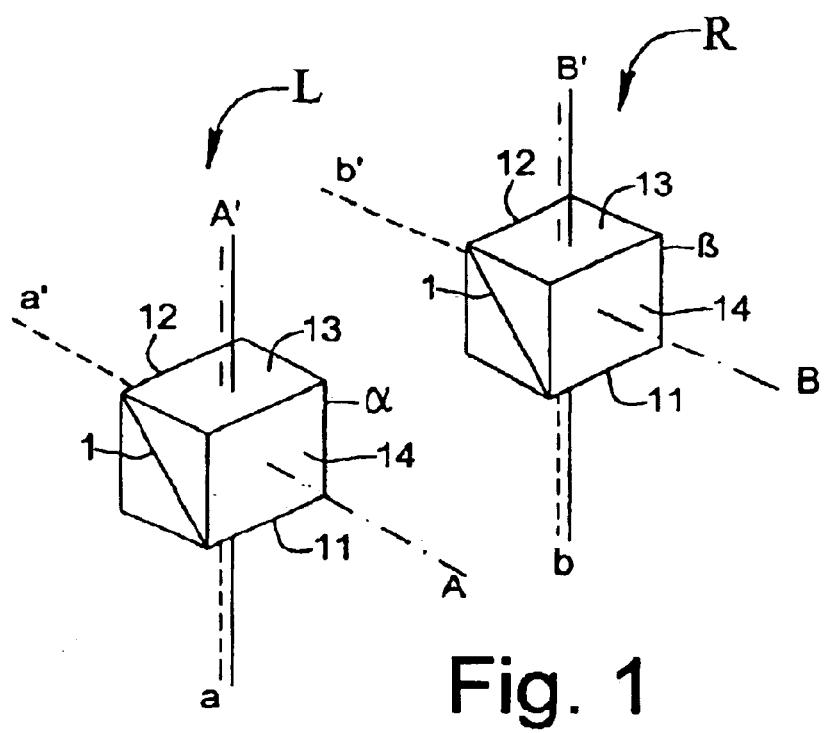
FIG. 1 shows the beam routing through the beam splitter prisms or cubes used in the binocular beam path of a stereomicroscope.
Figure 2:
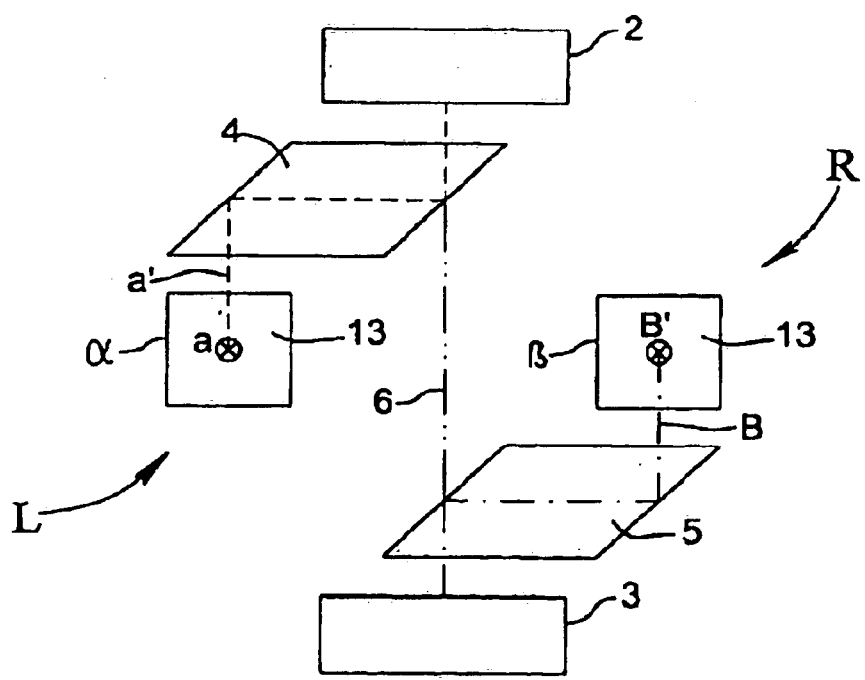
FIG. 2 shows a plan view of the beam splitter cubes depicted in FIG. 1 and the associated optical switchers, according to an exemplary embodiment of the present invention.

The invention will be described below, with no limitation as to general applicability, with reference to a stereomicroscope beam path (only partially depicted). In FIGS. 1 and 2, identical parts or elements are always labeled with the same reference characters, so that the individual parts need not always be presented again.

FIG. 1 shows in perspective the beam routing through the beam splitter prisms or cubes used in the binocular beam path of a stereomicroscope. The beam splitter cubes used in the left beam path L and right beam path R are labeled with the reference characters $\alpha$ and $\beta$. Beams a and b (depicted with solid and dashed lines) coming from the microscope objectives encounter lower plane 11 (not visible; in FIG. 1) of beam splitter cubes $\alpha$ and $\beta$, enter the beam splitter cubes, and are divided by the respective partially reflective plane 1 of beam splitter cubes $\alpha$ and $\beta$ in accordance with the ratio (for example, 50:50) defined by the configuration or coating of said plane 1. Components a' or b' (depicted with dashed lines) that have been deflected 90° pass through rear plane 12 (also not visible in FIG. 1) of the beam splitter cubes and emerge therefrom, and can be imaged, for example, by an imaging module (not depicted in FIG. 1) such as a video unit and a photographic camera. The components (depicted with solid lines) that continue through plane 1 emerge from the respective (upper) plane 13 of the beam splitter cubes, pass through components (not depicted) of the stereomicroscope configured in usual fashion, and are then perceived by a viewer. Light arriving from a display unit (not depicted in FIG. 1) along beam paths A and B (depicted with dot-dash lines) at the respective (front) planes 14 of the beam splitter cubes is also divided by plane 1. Components A' and B' that have been deflected 90° are also perceived by the viewer. The component passing through plane 1 emerges from plane 12 together with beams a' and b'. If light a' and b' coming from the microscope objective is to be imaged by an imaging module, these beams interference with image acquisition.

It is therefore usual to image only the light rays coming from the microscope objective that are reflected out of the beam path into which nothing is being reflected in.

FIG. 2 depicts an exemplary embodiment of the invention which makes it possible to select in simple fashion whether reflection is to occur into the left (L) or right (R) beam path, and to image with an imaging module the light emerging from the other beam path.

FIG. 2 shows a plan view of the arrangement depicted in perspective in FIG. 1, i.e. a view in the direction of the surface normal lines of plane 13. An imaging module 2 (only schematically depicted) is provided on the one side of the microscope beam path; a display module 3 (also only schematically depicted) is provided on the other side. The two modules 2 and 3 are arranged in such a way that their optical axes extend in the center between beam paths A and b' and a and B. Two rhomboid prisms 4 and 5, serving as optical switchers, are arranged between beam splitter cubes α and β and modules 2 and 3, respectively. Depending on the positions of rhomboid prisms 4 and 5, they connect imaging module 2 to left beam splitter cube α and display module 3 to right beam splitter cube β, or imaging module 2 to right beam splitter module β and display module 3 to left beam splitter cube α. It is particularly preferred in this context if the two rhomboid prisms 4 and 5 are arranged on a common shaft 6 (depicted with a dash-double-dot line), so that switching always occurs synchronously through 180° and the two modules are never simultaneously connected to the same channel. The reader is referred to FIG. 2 for further details.

Figure 3A:
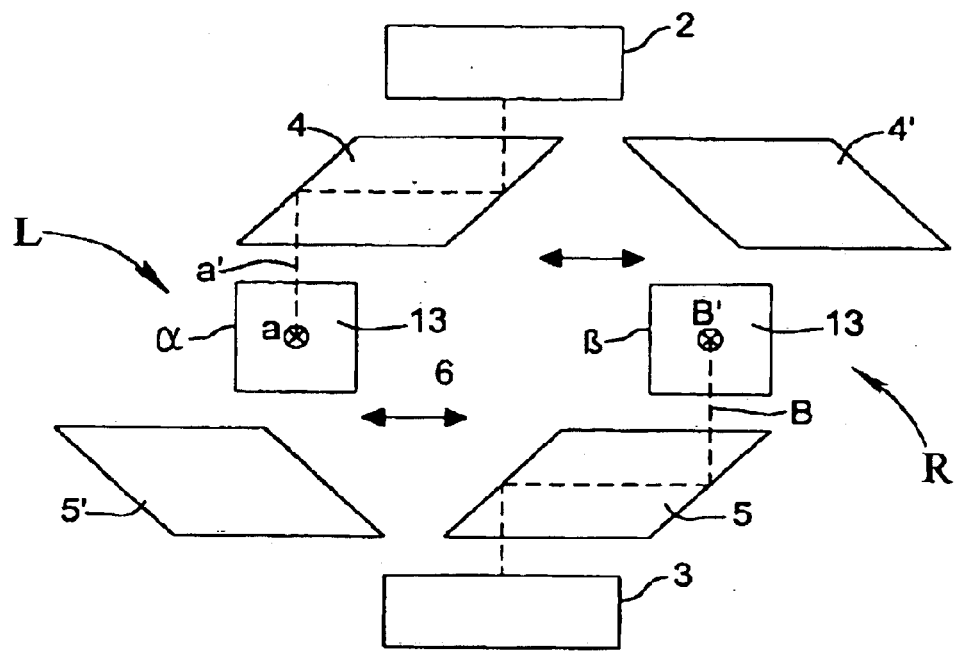
FIG. 3A shows a plan view similar to that of FIG. 2 wherein the optical switchers are slidable prisms.
Figure 3B:
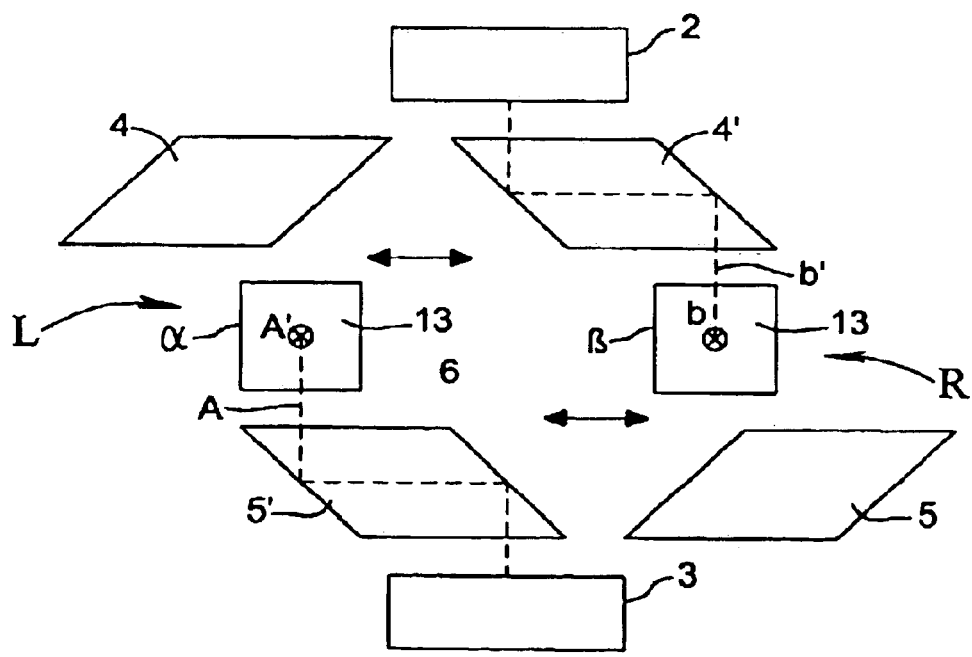
FIG. 3B is a view similar to that of FIG. 3A, wherein the optical switchers have been slidably switched as compared with FIG. 3A.

FIGS. 3A and 3B show a plan views of an embodiment wherein the optical switchers are slidable prisms. A first optical switcher associated with imaging module 2 includes rhomboid prisms 4 and 4' arranged in mirror image as shown, and a second optical switcher associated with display module 3 includes rhomboid prisms 5 and 5' also arranged in mirror image as shown. In the position shown in FIG 3A, prism 4 connects imaging module 2 to left beam splitter cube α, and prism 5 connects display module 3 to right beam splitter cube β. Prisms 4 and 4' of the first optical switcher are slidable as indicated by the double arrow, to a position shown in FIG. 3B wherein prism 4' connects imaging module 2 to right beam splitter cube β and prism 4 no longer connects imaging module 2 to left beam splitter cube α. In similar fashion, prisms 5 and 5' are slidable to the position shown in FIG. 3B wherein prism 5' connects display module 3 to left beam splitter cube a and prism 5 no longer connects display module 3 to right beam splitter cube β.

For example, the one switcher, which for example is configured as a rhomboid prism, can, depending on its angular position, reflect the data or images made available by the display module into the left or into the right channel of a binocular tube. The other switcher, which can be introduced in place of the rhomboid prism into the beam path, can be configured, for example, in such a way that it reflects the data or images into both channels. For that purpose, this switcher can comprise a beam splitter and two downstream rhomboid prisms. When this switcher is introduced into the beam path, it is preferred if the switcher of the imaging module is in a position in which no light is directed out of the beam path onto the imaging module.

The optical instrument or device configured according to the present invention has a number of advantages.

Since the individual modules do not need to be reinserted during operation, the simple result is that they do not need to be arranged for unrestricted access. Instead, they can be provided in space-saving fashion in the interior of the instrument or device. As a rule, the configuration according to the present invention in fact makes it possible to arrange them in the device in such a way that they need to be removed only for servicing purposes. Only if the modules are to be used with multiple instruments or devices must they be configured in such a way that they can easily be detached from the device or instrument.

If the instrument or device has more than one binocular viewing port, the individual modules can then also be used for different binocular beam paths or indeed simultaneously for two or more binocular beam paths. Regarding instruments or devices having more than one binocular viewing port, the reader is referred by way of example to U.S. Pat. No. 4,138,191 and to the existing art recited on the cover page of that document. For example, it is possible to optically connect a display unit or a display module via corresponding optical switchers to any desired channel of the stereo beam paths provided for different observers, or even simultaneously to one respective channel of the two stereo beam paths of the surgical stereomicroscope described in U.S. Pat. No. 4,138,191.

In the optical instrument or device configured according to the present invention, it is particularly preferred if an imaging module and a display module are provided which can then selectably be optically connected to the left or right channel of the binocular beam path. Nonetheless, of course, more than two modules can also be provided. These can be, for example, various imaging modules such as, for example, a photographic camera and a video unit, and/or, various display modules of which one makes available data and the other images. In addition, however, other modules such as, for example, illumination units or laser modules for marking and/or treating or processing the specimen field can also be provided.

If an imaging or recording module and a display module are used simultaneously, it is preferred if they are optically connected to different beam paths of the binocular beam path, in order to prevent the occurrence of moiré effects. This is achieved in particularly simple fashion if the optical switchers of the recording module and of the display module are mechanically or electronically coupled to one another in such a way that the two modules cannot be connected simultaneously to the same beam path. In the case of rhomboid prisms, this can easily be done by the fact that the two prisms, depending on the light path in the prisms, are arranged on the same shaft, or that the two prism shafts are counter-coupled.

It is further preferred if the beam splitters are beam splitter prisms or beam splitter cubes, which allow both reflection in toward the viewing port and reflection out of the beam path.

The beam splitters are often permanent constituents of the respective channel; it is also possible, however, to join the beam splitter, for example, to the movable prisms or even to configure them integrally therewith. Although this increases the outlay for movement of the prisms, this embodiment nevertheless has the advantage that the beam splitter, can be matched to the particular module. In the case of a laser module, for example, it is possible to design the beam splitter in such away that it is opaque to the wavelength of the laser and thus deflects all of the laser light onto the specimen field, so that no laser light can emerge from the binocular viewing port.

It is moreover also possible to configure the optical instrument or device in such a way that each channel can be optically connected—generally via different beam splitters—to more than one module.

The invention is usable in particularly preferred fashion in microscopes and in particular in stereomicroscopes, in which the beam splitters are arranged, for example, in the parallel beam path between the microscope objective and the tube lens. The invention is nevertheless, of course, also usable in other instruments or devices, for example telescopes, binocular loupes, etc., in which reflection out of or into the beam path is possible. It is moreover expressly stated that the term "binocular viewing port" does not necessarily imply that the instrument or device is a stereo instrument or device.

What is claimed is:

1. An optical instrument comprising:
   at least one binocular viewing port defining at least one binocular beam path which has two channels;
   an imaging module;
   a display module;
   a first beam splitter for reflecting a portion of the beam path from one channel out onto the imaging module and alternatively for reflecting external image data from the display module into the one channel toward the viewing port, and a second beam splitter for reflecting a portion of the beam path from the other channel out onto the imaging module and alternatively for reflecting external image data from the display module into the other channel toward the viewing port, wherein the imaging module and the display module are arranged in stationary fashion with respect to the optical instrument; and
   a first optical switcher that optically connects the imaging module to either of the first beam splitter and the second beam splitter, and a second optical switcher that optically connects the display module to either of the first beam splitter and the second beam splitter.

2. The optical instrument as defined in claim 1, wherein each of the first and second optical switchers includes at least one rotatable prism.

3. The optical instrument as defined in claim 2, wherein the prisms are rhomboid prisms.

4. The optical instrument as defined in claim 1, wherein the first and second optical switchers each include slidable prisms.

5. The optical instrument as defined in claim 4, wherein the prisms are rhomboid prisms.

6. The optical instrument as defined in claim 1, wherein the imaging module and the display module are optically connected to different channels of the binocular beam path.

7. The optical instrument as defined in claim 6, wherein the first and second optical switchers are coupled to one another in such a way that the imaging module and of the display cannot be connected simultaneously to the same channel.

8. The optical instrument as defined in claim 7, wherein the first and second optical switchers are prisms coupled to one another by a shaft.

9. The optical instrument as defined in claim 1, wherein the first and second beam splitters are beam splitter prisms or beam splitter cubes.

10. The optical instrument as defined in claim 1, wherein the optical instrument is a microscope having a binocular viewing port.

11. The optical instrument as defined in claim 1, wherein the optical instrument is a stereo microscope having a binocular viewing port.

* * * * *